C. M. RICHARDSON.
LAWN BORDER TRIMMER.
APPLICATION FILED OCT. 4, 1917.

1,274,784.

Patented Aug. 6, 1918.
2 SHEETS—SHEET 1.

Inventor
C. M. Richardson

By
Attorneys

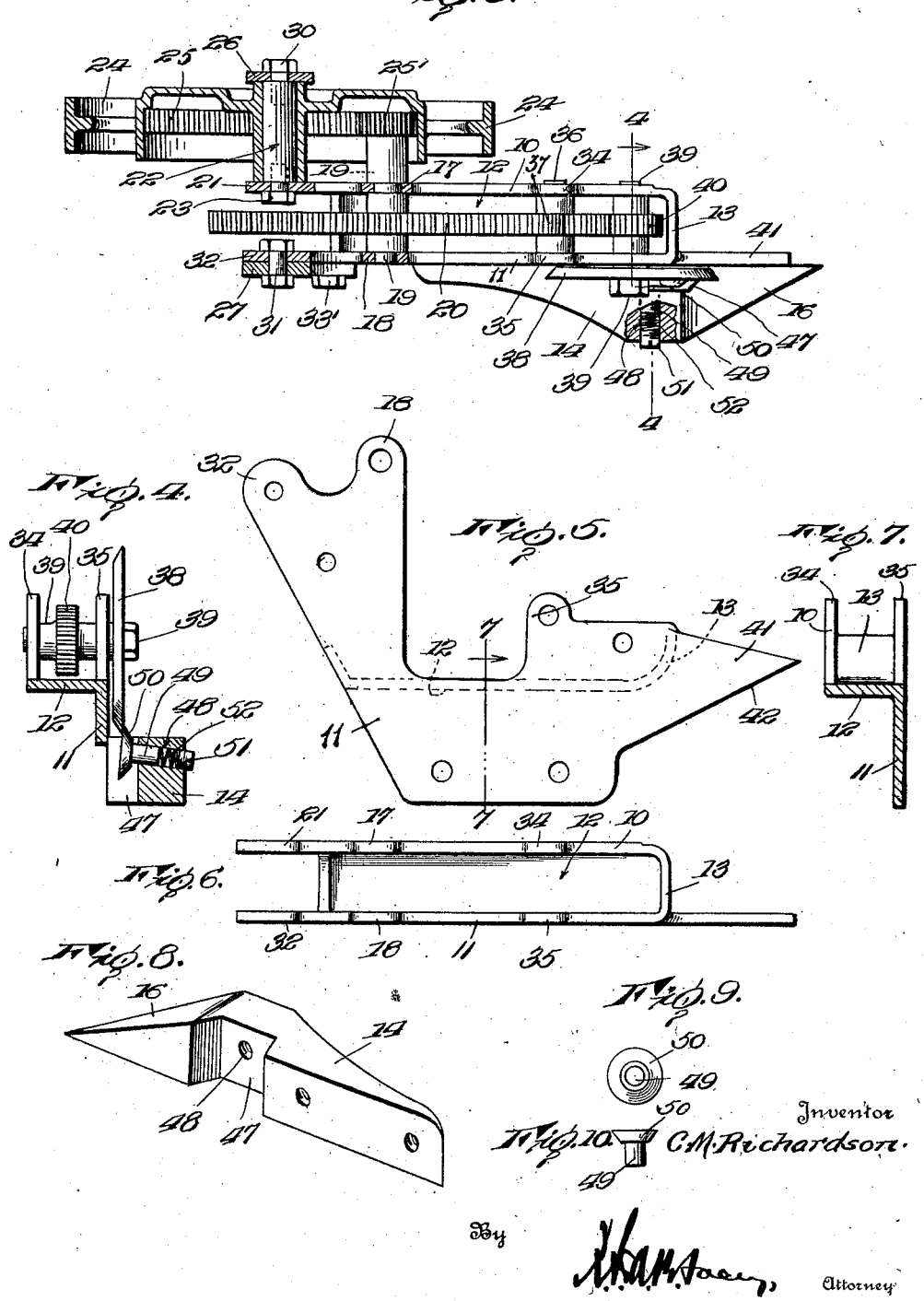

UNITED STATES PATENT OFFICE.

CLARENCE M. RICHARDSON, OF CLEVELAND, OHIO.

LAWN-BORDER TRIMMER.

1,274,784.　　　　　Specification of Letters Patent.　　Patented Aug. 6, 1918.

Application filed October 4, 1917. Serial No. 194,790.

*To all whom it may concern:*

Be it known that I, CLARENCE M. RICHARDSON, a citizen of the United States, residing at Cleveland, in the county of Cuyahoga and State of Ohio, have invented certain new and useful Improvements in Lawn-Border Trimmers, of which the following is a specification.

This invention relates to improvements in devices for trimming the borders of lawns, and for like purposes, and has for one of its objects to improve the construction and increase the efficiency and utility of devices of this character.

Another object of the invention is to produce a device whereby coacting rotary cutters are utilized to form the edge of the lawn and to cut the grass and other growths and thereby form a symmetrical edge to the lawn or park-way and to decrease the labor necessary to accomplish the desired results.

With these and other objects in view, the invention consists in certain novel features of construction, as hereinafter shown and described and then specifically pointed out in the claims; and in the drawings illustrative of the preferred embodiment of the invention—

Fig. 3 is a detail in section on the line 3—3 of Fig. 1 with the gear guard removed;

Fig. 4 is a section on the line 4—4 of Fig. 3 looking in the direction of the arrow.

Fig. 5 is a side view of the main supporting frame.

Fig. 6 is a plan view of the main supporting frame.

Fig. 7 is a section on the line 7—7 of Fig. 5 looking in the direction of the arrow.

Fig. 8 is a detached perspective view of the combined shoe and gathering member.

Figs. 9 and 10 are detached views of the lower rotary cutter.

The improved device comprises in general a supporting frame including a vertically disposed gathering member and having an operating handle adjustably coupled thereto, an upper rotory cutter for severing the grass, a traction wheel running upon the sod or grass adjacent to the path or walk, means for transmitting the motion of the traction wheel to the upper rotary cutter as the machine is moved over the ground, a laterally directed combined shoe and lower gathering member, and a yieldably supported lower rotary cutter carried by the shoe and coacting with the positively rotated upper cutter.

The supporting frame comprises side members 10—11 arranged in parallel relation and connected by a base web 12 having its forward end 13 curving upwardly. The body portion of the connecting web 12 is spaced above the lower line of the side member 11.

Figure 2:
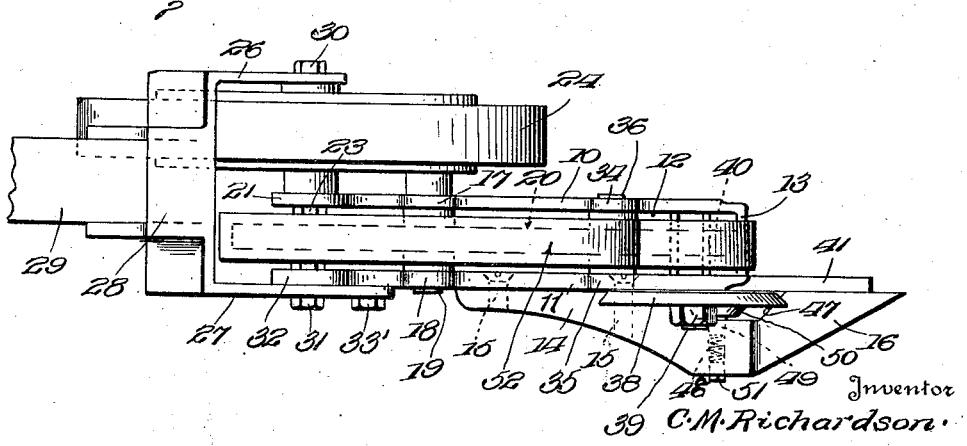
Fig. 2 is a plan view.

The shoe portion of the device is represented as a whole at 14 and is attached to the lower part of the side member 11 by any suitable means, for instance by screws 15. At its forward end the shoe is pointed, as shown at 16, and reduced toward its rear end as shown in Fig. 2. The side members 10—11 are formed with bearings to support the shafts of the driving mechanism for the upper rotary cutter, one set of the bearings represented at 17—18 supporting the main driving shaft 19 upon which the driving gear 20 is mounted as shown. The rear bearing 21 of the side member 10 supports one end of a stub shaft 22 by a threaded stud 23. Mounted for rotation upon the stub shaft 22 is the main traction wheel 24, the latter having an internal gear 25 spaced from the rim of the wheel as illustrated in Fig. 3. The shaft 19 is extended into the interior of the traction wheel 24 and is provided with a pinion 25' in constant engagement with the internal gear 25. A yoke frame to receive and support the operating handle forms a part of the improved device and comprises side members 26—27 connected at one end to a socket 28 in which the handle 29 is supported. The member 26 is apertured to receive a stud 30 threaded into the stub shaft 22 at the opposite end from the stud 23, while the side 27 of the yoke is pivotally united at 31 to a bearing portion 32 of the side 11 of the frame. The side member 27 of the yoke is extended downwardly below the pivot 31 and is provided with a segmental slot 33 through which a set bolt 33' operates, the set bolt being tapped into the side 11 of the frame. By this arrangement the yoke is adjustably supported by its arm 27 relatively to the frame member 11 while the arm 26 operates to effectually support the outer end of the stub shaft 22.

The outer face of the traction wheel 24 is preferably roughened or formed with ground engaging ribs.

Another set of bearings, represented at 34—35, are formed upon the side members 10—11 and support another stub shaft 36 carrying an idler gear 37 in constant engagement with the main driving gear 20. The main rotary cutter is represented at 38 and is mounted for rotation with a shaft 39, the latter in turn being mounted for rotation through the side members 10—11 and carrying a pinion 40 in constant engagement with the idler gear 37. By this arrangement the rotary motion of the traction wheel 24 is communicated through the gears and pinions to the rotary cutter 38 at a greatly increased speed.

Extending forwardly of the side member 11 of the frame is a projection 41 having its lower face inclined rearwardly and downwardly toward the member 11 and forms an upper "gathering" device which coöperates with the inclined portion 16 of the shoe to gather the material to be severed and conduct it into proper position to be severed by the cutters.

The inner face of the shoe 14 is provided with a recess 47, and extending through the body of the shoe is a bearing 48 communicating at one end with the recess.

Figure 1:
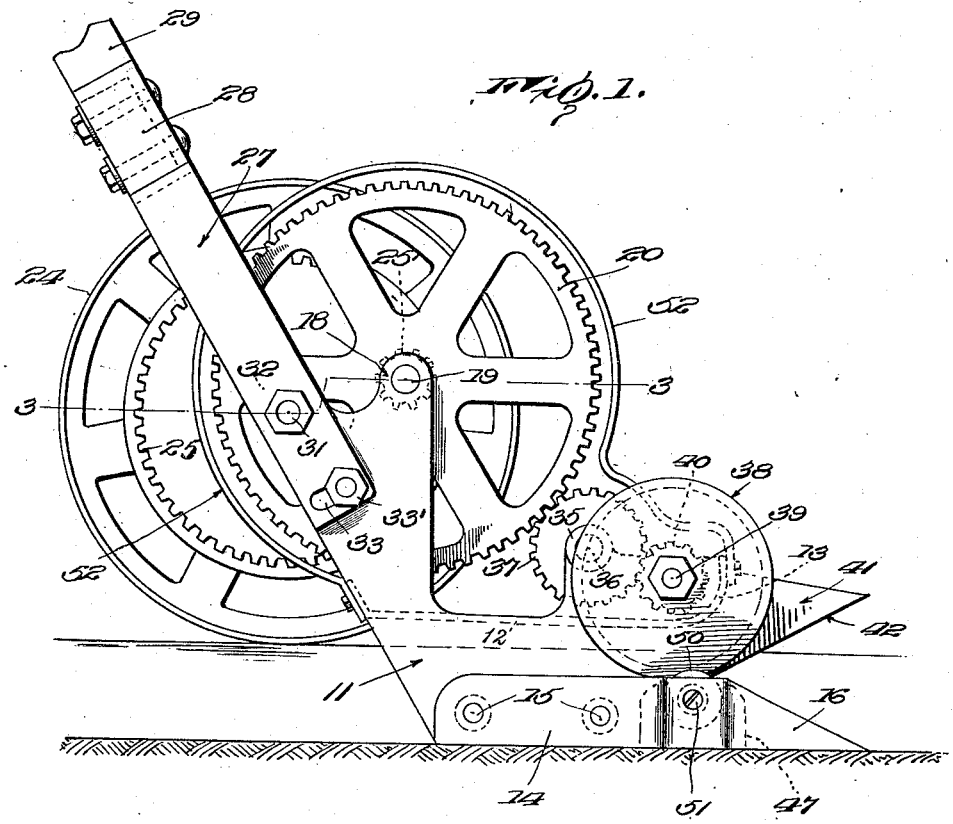
Figure 1 is a side elevation of the improved device.

Mounted for rotation by a stud 49 in the bearing 48 is a smaller rotary cutter 50 which overlaps the adjacent portion of the rotary cutter 38 for a short distance as shown in Figs. 1 and 4. The edges of the cutters 38 and 50 are beveled as shown with their larger faces overlapping, to produce the requisite shearing action.

The axial line of the bearing 48 is slightly oblique to the axial line of the shaft 39, as shown in Fig. 4 so that the stud 49 operates at a corresponding angle to the shaft 39, hence the smaller cutter 50 will also operate at a slight angle to the larger cutter 38, to improve the shearing action.

The bearing 48 extends entirely through the shoe 14 and is provided at the outer end with a screw plug 51, and disposed between the inner end of the stub shaft 49 and the plug 51 is a spring 52. By this means the stub shaft is maintained yieldably in position and holds the smaller cutter 50 in yieldable engagement with the larger cutter 38. It will be noted that the lower line of the shoe 14 is a considerable distance below the lower line or path of the traction wheel 24, so that while the wheel 24 and the web 12 travel upon the sod or ground at the edge of the path, the shoe together with the cutters will operate below the line of the ground upon which the traction wheel travels.

A guard or shielding band 52 is connected to the coupling web member 12—13 and extends over the exposed gears.

In operating the improved device the shoe portion is moved over the ground at the edge of the lawn with its inclined face 16 beneath the overhanging grass which is thus elevated over the upper face of the shoe while the upper gatherer member 41 bears over the upper portion of the grass, the gathering members coacting to cause the grass to be fed into proper position to be operated upon by the rapidly revolving rotary cutters, and the grass thereby effectually and uniformly severed, and producing a correspondingly uniform and even edge to the lawn.

The improved device operates quickly, accurately and efficiently to produce a uniform edge to a lawn and with a marked decrease in labor and the saving of time, as the device operates as fast as a man can walk in pushing the implement.

The sizes of the gears are proportioned to produce a very rapid rotation of the cutters, and the dimensions may be varied as required.

Having thus described the invention, what is claimed as new is:

1. In a lawn border trimmer, a support including a projection having a rearwardly and downwardly inclined lower face and constituting an upper gathering member, a bearing shoe extending laterally from the frame and having the upper face of its forward portion inclined upwardly and rearwardly and constituting a lower gathering member coacting with the upper gathering member, an upper rotary cutter carried by said support, a lower rotary cutter carried by said shoe and coacting with the upper rotary cutter, and means carried by said support for driving said upper cutter.

2. In a lawn border trimmer, a support including a projection having a rearwardly and downwardly inclined lower face and constituting an upper gathering member, a traction wheel carried by said frame, a bearing shoe extending laterally from the frame and having the upper face of its forward portion inclined upwardly and rearwardly and constituting a lower gathering member coacting with the upper gathering member, an upper rotary cutter carried by said support, a lower rotary cutter carried by said shoe and coacting with the upper rotary cutter, and means for transmitting motion from said traction wheel to said upper cutter.

3. In a lawn border trimmer, a supporting frame including spaced side members and a connecting web, a stub shaft supported at one end by one of said side members, a traction wheel mounted upon said stub shaft, a yoke frame including a handle socket and spaced arms, said arms being pivoted respectively to said stub shaft and to one of said frame sides, an upper rotary cutter carried by said frame, means connected with said traction wheel to drive said cutter, a bearing shoe extending laterally of said frame, and a lower rotary cutter carried by said shoe and coacting with the upper rotary cutter.

4. In a lawn border trimmer, a supporting frame including spaced side members and a connecting web, a stub shaft supported at one end by one of said side members, a traction wheel mounted upon said stub shaft, a yoke frame including a handle socket and spaced arms, said arms being pivoted respectively to said stub shaft and to one of said frame sides, means for adjusting said yoke frame relatively to said supporting frame, an upper rotary cutter carried by said frame, means connected with said traction wheel to drive said cutter, a bearing shoe extending laterally of said frame, and a lower rotary cutter carried by said shoe and coacting with the upper rotary cutter.

5. In a lawn border trimmer, a supporting frame including spaced side members and a connecting web with one side member depending below the line of the web, an upper rotary cutter carried by said frame members, means carried by the frame for rotating said upper rotary cutter, a bearing shoe extending laterally from the depending portion of said frame member, and a lower rotary cutter carried by said shoe and coacting with the upper rotary cutter.

6. In a lawn border trimmer, a supporting frame including spaced side members and a connecting web with one side member depending below the line of the web and provided with a projection having a rearwardly and downwardly inclined face and constituting an upper gathering member, an upper rotary cutter carried by said frame members, means carried by the frame for rotating said upper rotary cutter, a bearing shoe extending laterally from the depending portion of said frame member and having its forward portion inclined upwardly and rearwardly and constituting a lower gathering member coacting with the upper gathering member, and a lower rotary cutter carried by said shoe and coacting with the upper rotary cutter.

7. In a lawn border trimmer, a support including a projection having a rearwardly and downwardly inclined lower face and constituting an upper gathering member, a bearing shoe extending laterally from the frame and having the upper face of its forward portion inclined upwardly and rearwardly and constituting a lower gathering member coacting with the upper gathering member, an upper rotary cutter carried by said support, a stud mounted for rotation with its axial line obliquely to the axial line of the upper rotary cutter, a lower rotary cutter carried by said stud, and means carried by said support for transmitting motion to said upper cutter.

In testimony whereof I affix my signature.

CLARENCE M. RICHARDSON. [L. S.]

Copies of this patent may be obtained for five cents each, by addressing the "Commissioner of Patents, Washington, D. C."